(12) United States Patent
Higuchi

(10) Patent No.: US 7,762,460 B2
(45) Date of Patent: Jul. 27, 2010

(54) INFORMATION PROCESSING DEVICE FOR USING BAR CODE AND RADIO FREQUENCY-IDENTIFICATION TAG

(75) Inventor: Naoshi Higuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 1147 days.

(21) Appl. No.: 11/060,394

(22) Filed: Feb. 17, 2005

(65) Prior Publication Data

US 2005/0178832 A1   Aug. 18, 2005

(30) Foreign Application Priority Data

Feb. 18, 2004   (JP) .............................. 2004-040714

(51) Int. Cl.
G06K 7/00   (2006.01)
(52) U.S. Cl. ...................................... 235/440; 235/492
(58) Field of Classification Search .................. 235/385, 235/462.01, 462.44, 487, 492
See application file for complete search history.

(56) References Cited

U.S. PATENT DOCUMENTS

| | | | | |
|---|---|---|---|---|
| 6,056,199 A | * | 5/2000 | Wiklof et al. .......... | 235/462.45 |
| 6,109,526 A | * | 8/2000 | Ohanian et al. ........ | 235/462.45 |
| 6,415,978 B1 | * | 7/2002 | McAllister ............. | 235/462.01 |
| 6,722,565 B2 | * | 4/2004 | Takeuchi et al. ............ | 235/454 |
| 6,830,181 B1 | * | 12/2004 | Bennett ....................... | 235/440 |
| 2003/0177053 A1 | * | 9/2003 | Otto ............................ | 705/10 |

FOREIGN PATENT DOCUMENTS

| | | |
|---|---|---|
| JP | 62-097083 | 5/1987 |
| JP | 5-40962 | 1/1993 |
| JP | 11-096463 | 4/1999 |
| JP | 11-250351 | 9/1999 |
| JP | 2000-025940 | 1/2000 |
| JP | 2000-348133 | 12/2000 |
| JP | 2001-014355 | 1/2001 |
| JP | 2001-052105 | 2/2001 |
| JP | 2001-291079 | 10/2001 |
| JP | 2002-24755 | 1/2002 |
| JP | 2002024755 A * | 1/2002 |
| JP | 2002-049905 | 2/2002 |
| JP | 2002-083278 | 3/2002 |
| JP | 2002-123805 | 4/2002 |
| JP | 2003-044797 | 2/2003 |
| JP | 2003-087148 | 3/2003 |
| JP | 2003-141295 | 5/2003 |
| WO | WO-94/18642 | 8/1994 |

* cited by examiner

*Primary Examiner*—Seung H Lee
(74) *Attorney, Agent, or Firm*—Dickstein Shapiro LLP (57) ABSTRACT

The service terminal 1 which contains bar code reader 2, RF-ID reader 3 and information processing block is moved to a medium containing the bar code and RF-ID tag. Both of the bar code reader 2 and RF-ID reader 3 are set to the positions that information can be read from the bar code and RF-ID tag. In this case, the information processing block controls the bar code reader 2 and RF-ID reader 3 to read information from the bar code and RF-ID tag.

2 Claims, 11 Drawing Sheets

INFORMATION PROCESSING DEVICE FOR USING BAR CODE AND RADIO FREQUENCY-IDENTIFICATION TAG

BACKGROUND OF THE INVENTION

1. Field of the Invention

The present invention relates to an information processing device, and an information processing method and program product therefor. In particular, it relates to an information processing device using a bar code and RF-ID tag, and an information processing method and program product therefor.

2. Description of the Related Art

In this type of conventional information processing systems, a bar code indicating commodity (merchandise) information on a commodity (commercial product) is printed on the commodity so that the bar code will be read for sales management (for example, see JPA 2003-141295). This type of information processing systems include a system in which a bar code reader for reading barcodes is connected to a point of sales (POS) terminal.

On the other hand, a system using an IC chip, such as a Radio Frequency Identification (RF-ID) tag, a radio tag, or an IC tag, storing commodity information instead of a bar code has also been proposed and commercialized as one type of conventional information processing system.

A system using a bar code and an IC chip in combination has been further proposed as another type of conventional information processing system. In this case, the proposed methods include a method of storing the same information in the bar code and IC chip (see JPA 2002-123805, JPA 2002-049905 and JPA 2002-083278), a method of checking information using both the bar code and IC chip (see JPA 2001-291079 and JPA H11(1999)-096463), and a method of displaying both pieces of information (for example, code classification information) stored in the bar code and the IC chip, respectively (see JPA H05(1993)-040962).

The above-mentioned conventional information processing systems use a bar code and/or an IC chip as media for storing commodity information. However, these systems are not available for prize contests requiring the purchase of a book in which an advertisement (AD) for a prize contest is published, as a precondition for participating in the prize contests (that is, for "must-buy prize contests").

In a system employing a "must-buy prize contest" method, when an advertisement for a prize contest, or prize ad, is published in a book, it is common practice for a participant to cut out a "prize entry ticket" printed on a page in the book and send a postcard with the prize entry ticket on it.

In addition, a system has also been proposed, which provides further information to consumers (users of cellular phones) by printing a bar code on advertising posters so that it can be read by cellular phones (portable telephones). However, a disadvantage arises that such a system cannot use information based on the location where each consumer sees each advertising poster.

To solve this disadvantage, it may be considered a method of including location information in the bar code. In this case, however, the bar code printed on the advertising posters must vary depending on the posted location, causing another disadvantage that the print costs increase.

The above-mentioned JPA 2002-123805, JPA 2002-049905, and JPA 2002-083278 teach a technique for visibly displaying, in a bar code, all or part of information recorded in an IC chip, a technique for recording all or part of data in the bar code into a non-contact data carrier as common data, and a technique for storing commodity management information (that is, the same information) in both the IC chip and bar code. These techniques, however, cannot be used in prize offering or advertisement systems including different kinds of information.

On the other hand, the above-mentioned JPA 2001-291079 and JPA H11(1999)-096463 teach a technique for double-checking the validity of IC chip information and bar code information, and a technique for checking printed information against IC chip information. Like in the above cases, these techniques cannot also be used in prize offering or advertisement systems including different kinds of information.

SUMMARY OF THE INVENTION

It is therefore an object of the present invention to provide an information processing device capable of using the combination of a bar code and RF-ID including different kinds of information according to simple operating procedures, and an information processing method and program product therefor.

In one aspect of the present invention, an information processing device comprises: a bar code reader for reading first information from a bar code of a medium including the bar code and a radio frequency identification (RF-ID) tag; a RF-ID reader for reading second information from the RF-ID tag; and control means for executing first control for reading the first information by using the bar code reader and second control for reading the second information by using the RF-ID reader, wherein the control means executes the first and second control when the bar code and RF-ID exist in readable areas of the bar code reader and RF-ID reader.

In another aspect of the present invention, an information processing method comprises the steps of: setting a bar code reader and a RF-ID reader, or a medium including a bar code and a radio frequency identification (RF-ID) tag so that the bar code and RF-ID tag exist in readable areas of the bar code reader and RF-ID reader; and executing first control for reading the first information by using the bar code reader and second control for reading the second information by using the RF-ID reader, the executing step being executed by control means.

In still another aspect of the present invention, a program product embodied on a storage portion of information processing device that contains bar code reader and RF-ID reader and comprising code that, when the program product is executed, cause the information processing device to perform an information processing method comprises the step of executing first control for reading first information by using a bar code reader from a medium including the bar code and a radio frequency identification (RF-ID) tag, and second control for reading second information by using a RF-ID reader from the medium, when the bar code and RF-ID tag exist in readable areas of the bar code reader and RF-ID reader.

In the present invention, the bar code information and the RF-ID information are used in combination to make effective use of both of the bar code characterized by its conspicuous appearance and the RF-ID tag characterized by being readable by electromagnetic radiation even when it cannot be seen directly by the user, thereby creating added value. It allows the user to read both pieces of information automatically with a simple operation without reading the bar code and the RF-ID tag individually.

The present invention is applied to a device using both the bar code and the RF-ID tag, so that the information in the bar code and the information in the RF-ID tag can be used in combination, thereby simplifying the operating procedures for a user.

As described above, the structure and operation of the present invention have the advantage of using the combination of recorded information in the bar code and RF-ID tag and executing different information processing according to simple operating procedures.

DESCRIPTION OF EMBODIMENTS

Figure 1:
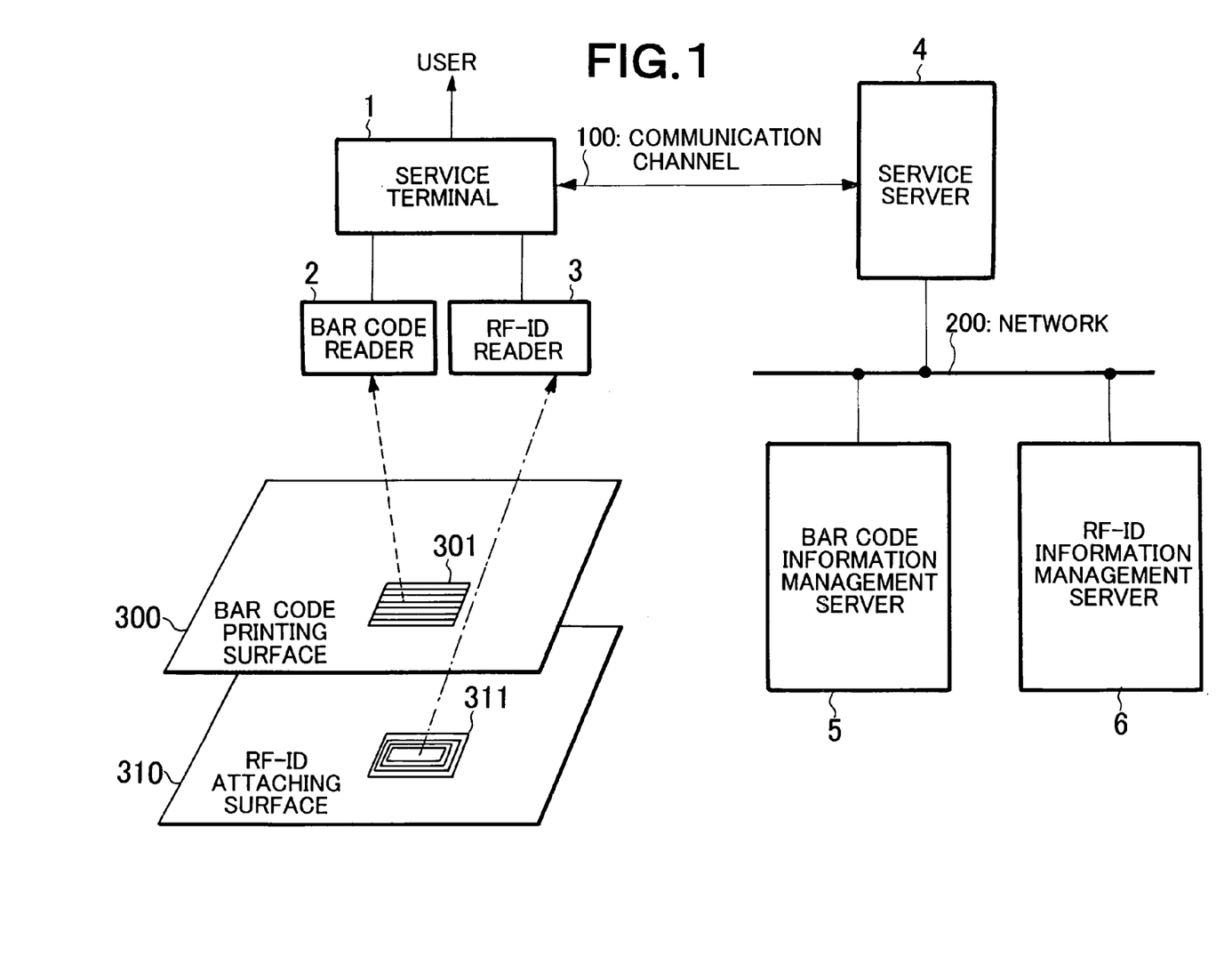
FIG. 1 is a block diagram showing an example of the structure of an information processing system according to embodiments of the present invention.

Embodiments of the present invention will now be described with reference to the accompanying drawings. FIG. 1 is a block diagram showing an example of the structure of an information processing system containing an information processing device according to the embodiments of the present invention. In FIG. 1, the information processing device includes service terminal 1 used by a user, and bar code reader 2, radio frequency identification (RF-ID) reader 3, and which are provided in the service terminal 1.

Figure 11:
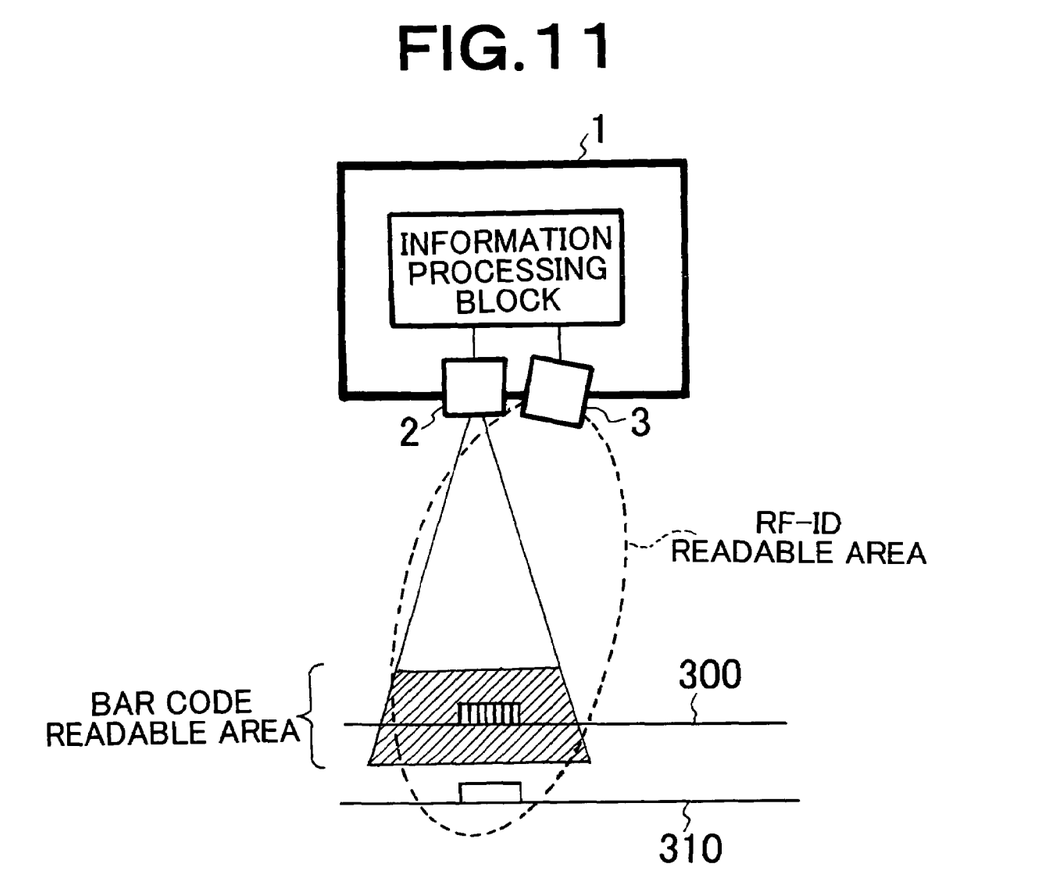
FIG. 11 is an illustration showing the arrangements of the bar code reader and the RF-ID reader when bar code and RF-ID tag are set to overlap each other.
Figure 12:
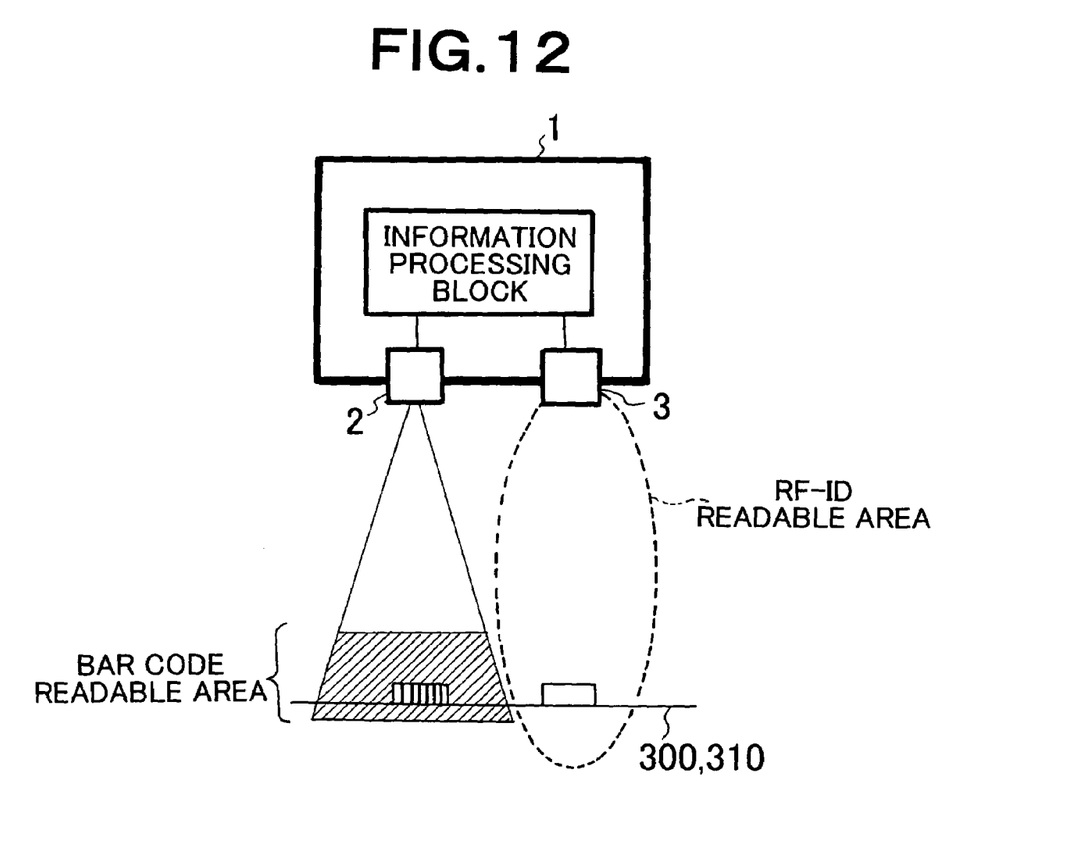
FIG. 12 is an illustration showing the arrangements of the bar code reader and the RF-ID reader when bar code and RF-ID tag are placed side by side each other.

As shown in FIGS. 11 and 12, the bar code reader 2, RF-ID reader 3 and an information processing block are provided in the service terminal 1. The information processing block as control means controls a reading operations of the bar code reader 2 and RF-ID reader 3. The bar code reader 2 and RF-ID reader 3 may separate as another body from the service terminal 1.

The service terminal 1 is moved to a medium containing the bar code and RF-ID tag or a medium containing the bar code and RF-ID tag is moved to the service terminal 1. The bar code and RF-ID come to exist in readable areas of the bar code reader and RF-ID reader. In other words, both of the bar code reader 2 and RF-ID reader 3 come to exist at the positions that information can be read from the bar code and RF-ID tag. In this case, the information processing block controls the bar code reader 2 and RF-ID reader 3 to read information from the bar code and RF-ID tag. The RF-ID tag is referred to as a radio tag, an IC tag, or a radio IC tag.

FIG. 11 is an illustration showing the arrangements of the bar code reader and RF-ID reader when the bar code and RF-ID tag are set to overlap each other, and FIG. 12 is an illustration showing the arrangements of the bar code reader and RF-ID reader when the bar code and RF-ID tag are placed side by side each other.

As shown FIGS. 11 and 12, the positions of the bar code reader and RF-ID reader is set so that when the bar code reader 2 is set to the bar code readable position, the RF-ID reader 3 is also set to the RF-ID tag readable position. The positions of the bar code reader and RF-ID reader may be set so that when the RF-ID reader 3 is set to the RF-ID tag readable position, the bar code reader 2 is also set to the bar code readable position.

The case that the positions of the bar code reader and RF-ID reader is set so that when the bar code reader 2 is set to the bar code readable position, the RF-ID reader 3 is also set to the RF-ID tag readable position is described as following. A digital camera, a laser device or the like can be used as the bar code reader.

For example, a digital camera is used as the bar code reader. If a user of the service terminal 1 moves the service terminal 1 on a shooting position while the user watches an image of the bar code by a display screen of the service terminal, the digital camera is set to the bar code reading-position and at the same time, the RF-ID reader 3 is also set to the RF-ID tag reading-position. And then, the user switches on the digital camera to read information from the bar code and RF-ID tag in fixed reading sequence by the information processing block.

As reading sequence operation, for example, there is a sequence operation that bar code-reading by the bar code reader 2 and RF-ID tag-reading by the RF-ID reader 3 are executed in concurrent operation, or a sequence operation that RF-ID tag-reading by the RF-ID reader 3 is executed after bar code-reading by the bar code reader 2 is executed.

The sequence operation in case that the positions of the bar code reader and RF-ID reader are be set so that when the RF-ID reader 3 is set to the RF-ID tag readable position, the bar code reader 2 is also set to the bar code readable position, is as following.

That is, for example, there is a sequence operation that bar code-reading by the bar code reader 2 and RF-ID tag-reading by the RF-ID reader 3 are executed in concurrent operation, or a sequence operation that bar code-reading by the bar code reader 2 is executed after RF-ID tag-reading by the RF-ID reader 3 is executed.

When the digital camera is used as the bar code reader, a typical readable area of the bar code reader is a fixed distance area from the bar code reader 2 in a circular cone area which the bar code reader 2 is arranged at a vertex thereof (shown in FIGS. 11 and 12). On the other hand, a typical readable area of the RF-ID reader is an elliptic area that the RF-ID reader 3 is arranged at one tip thereof (shown in FIGS. 11 and 12).

The structure of a reading portion of the service terminal 1 when bar code and RF-ID tag are set to overlap each other is described with reference to FIG. 11.

The RF-ID reader is set in the service terminal as the RF-ID tag exists in the readable area of the RF-ID reader, when a user turn the service terminal 1 to the bar code as the bar code exists in the readable area of the bar code reader. Concretely, the bar code reader and RF-ID reader are placed side by side each other and the RF-ID reader is set as an axis of the RF-ID reader is leaned to a direction of a readable area of the bar code reader. The end of the readable area of the RF-ID reader to the service terminal is further than the end of the readable area of the bar code reader to the service terminal. In the case that the bar code exists in the readable area of the bar code reader when a user turn the service terminal 1 to the RF-ID tag as the RF-ID tag exists in the readable area of the RF-ID reader, the bar code reader and RF-ID reader are placed side by side each other and the bar code reader is set as an axis of the bar code reader is leaned to a direction of a readable area of the RF-ID reader.

The structure of a reading portion of the service terminal 1 when bar code and RF-ID tag are set to place side by side each other is described with reference to FIG. 12.

The bar code reader and RF-ID is set in the service terminal as the RF-ID tag exists in the readable area of the RF-ID reader, when a user turn the service terminal 1 to the bar code as the bar code exists in the readable area of the bar code reader. Concretely, the bar code reader and RF-ID reader are placed side by side each other and axes of the bar code and RF-ID reader is arranged in parallel. In this case, a distance between the bar code reader and the RF-ID reader is set to be equal to a distance between the bar code and the RF-ID tag. In the case that the bar code exists in the readable area of the bar code reader when a user turn the service terminal 1 to the RF-ID tag, abovementioned distance relation is similarly employed.

The information processing system includes the aforementioned information processing device, service server 4 providing services, bar code information management server 5 for managing bar code information, and RF-ID information management server 6 for managing RF-ID information.

The service terminal 1 and the service server 4 are connected each other through communication channel 100. The service server 4, the bar code information management server 5, and the RF-ID information management server 6 are connected one another through a network 200.

In operation, when the user operates the service terminal 1 to instruct the bar code reader 2 to read bar code 301 printed on bar code printing surface 300, the RF-ID reader 3 automatically starts reading RF-ID tag 311 attached on RF-ID attaching surface 310. After completion of reading the bar code 301 and RF-ID tag 311 by the bar code reader 2 and the RF-ID reader 3, the service terminal 1 sends information read from the bar code 301 and the RF-ID tag 311 to the service server 4 through the communication channel 100.

The service server 4 is connectable with the bar code information management server 5 and the RF-ID information management server 6 through the network 200. The service server 4 works in liaison with the bar code information management server 5 and RF-ID information management server 6 on the basis of the read information (information read from the bar code 301 and RF-ID tag 311) sent from the service terminal 1. The service server 4 sends the result of collaboration work to the service terminal 1 through the communication channel 100. Upon receipt of the result from the service server 4 through the communication channel 100, the service terminal 1 presents it to the user.

In the embodiments of the present invention, when the user performs the reading of the bar code 301, the information processing system also read the RF-ID tag 311 automatically so that the results of reading both pieces of information from the bar code 301 and RF-ID tag 311 will be used in combination. It allows the user to use the system with a simple operation.

In the embodiment, if different kinds of information are recorded in the bar code and the RF-ID tag, respectively, the bar code information administrator and the RF-ID information administrator can manage information independently.

The information processing device of the embodiment is applied to a device using the bar code and the RF-ID tag in combination. In such a device, the bar code and the RF-ID tag are arranged to overlap so that when such a reader that combines a bar code reader with a RF-ID reader is moved to such a position that the bar code reader can read the bar code, the RF-ID reader will also come to such a position that it can read the RF-ID tag. Then, using the property of the printing material of the bar code (that is, the property of allowing electromagnetic waves to pass through), the bar code and the RF-ID tag can be read even when they overlap.

Further, in the information processing device of the embodiment, part of the information in the bar code describes that it is used in combination with the RF-ID tag so that the reader will automatically start reading the RF-ID tag at the time of reading the bar code.

Furthermore, in the information processing device of the embodiment, different kinds of information are recorded in the bar code and the RF-ID tag, respectively, so that both kinds of information will be used in combination.

First Embodiment

Figure 2:
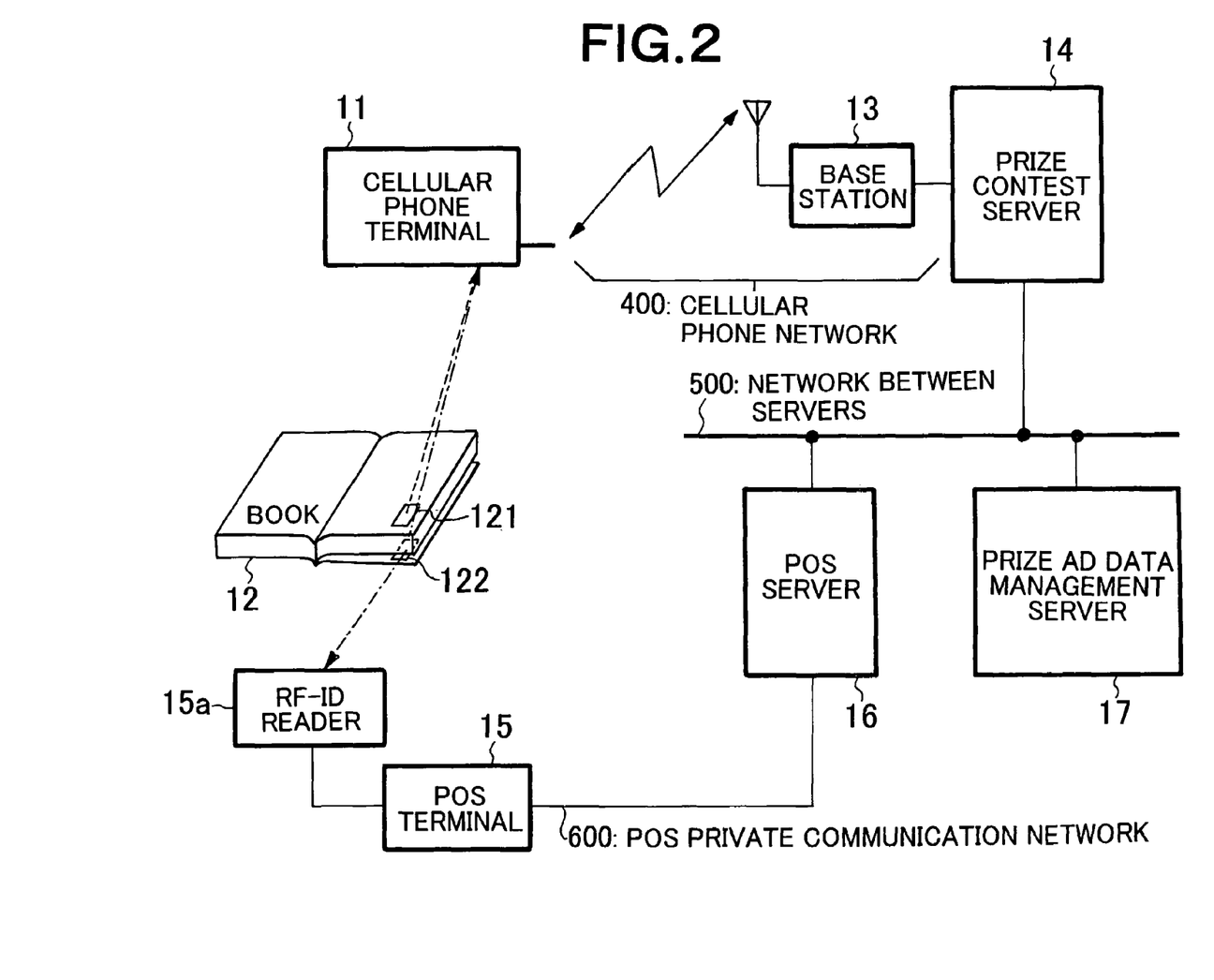
FIG. 2 is a block diagram showing the structure of an information processing system according to an embodiment of the present invention.

FIG. 2 is a block diagram showing the structure of a book prize offering system as an information processing system containing an information processing device according to a first embodiment of the present invention. The book prize offering system includes cellular phone terminal 11, base station 13, prize contest server 14, POS (Point of Sales) terminal 15 with RF-ID reader 15a, POS server 16, and a server for managing advertisement data for prize contests, or prize ad data management server 17. As a mobile communication terminal, there is a cellular phone terminal, a Personal Digital Assistant (PDA), or the like.

The cellular phone terminal 11 is equipped with a bar code reader and a RF-ID reader, not shown, and a communication function (also not shown) for communication through cellular phone network 400.

Because bar code 121 and RF-ID tag 122 of book 12 are set to overlap each other, the bar code reader and RF-ID reader are provided close to each other, and an axis of the RF-ID reader is leaned to a direction of a readable area of the bar code reader. The length of the reading range of the RF-ID reader is set to be longer by about 2 cm than that of the reading range of the bar code reader. The length of 2 cm is longer than the thickness of a typical magazine.

In this case, the RF-ID tag 122 is attached on the back cover of the book 12, and the bar code 121 is printed on at least one page in such a position that it overlaps the RF-ID tag 122.

In the embodiment, the cellular phone terminal 11 and the book 12 are structured as mentioned above. In operation, when the user brings the cellular phone terminal 11 to such a position that the bar code reader can read the bar code 121 of the book 12, the RF-ID reader of the cellular phone terminal 11 can read the RF-ID tag 122 of the book 12 concurrently with reading the bar code 121.

The POS terminal 15 with the RF-ID reader 15a for reading the RF-ID tag 122 is communicable with the POS server 16 through POS private (dedicated) communication network 600. The cellular phone terminal 11 and the prize contest server 14 are communicable with each other through the cellular phone network 400. The prize contest server 14, the POS server 16, and the prize ad data management server 17 are communicable with one another through network between servers (inter-server network) 500.

Referring to FIG. 2, the operation of the book prize offering system according to the embodiment of the present invention will be described. It is assumed that book identification information of the book 12 (serial number or the like) is recorded in the RF-ID tag 122, and information for identifying the page on which the bar code 121 is printed is recorded in the bar code 121.

The POS server 16 holds information whether the book 12 is "unpurchased" or "purchased." In the initial state, the POS server 16 holds that the book 12 is "unpurchased." When the user (consumer) buys the book 12, the POS terminal 15 reads the RF-ID tag 122 by the RF-ID reader 15*a*, and notifies the POS server 16 that the book 12 has been "purchased." Upon receipt of the notification, the POS server 16 updates the information to "purchased."

The user can operate the cellular phone terminal 11 to participate in a prize contest offered by a prize ad in the book 12. In this case, the user operates the cellular phone terminal 11 to read the bar code 121 and RF-ID tag 122 in a single-step operation and send the reading results to the prize contest server 14.

The prize contest server 14 receives the reading results of the bar code 121 and RF-ID tag 122 from the cellular phone terminal 11, and based on the reading result of the RF-ID tag 122, it contacts the POS server 16 for information about the state of the book 12.

If the state of the book 12 is "unpurchased," since it means that the user has not purchased it yet, that is, the user may be browsing it in a bookstore, the prize contest server 14 will not accept the participation in the prize contest. On the other hand, if the state of the book 12 is "purchased," the prize contest server 14 will contact the prize ad data management server 17 for information based on the reading result of the bar code 121.

The prize ad data management server 17 identifies the prize ad based on the reading result of the bar code 121, and then returns to the prize contest server 14 an entry form with items to be filled in for participation in the prize contest. The prize contest server 14 transfers to the cellular phone terminal 11 the entry form with the items necessary for participation in the prize contest.

The cellular phone terminal 11 encourages the user to fill in the entry form and send the filled-in form to the prize contest server 14. The prize contest server 14 internally stores the filled-in form from the cellular phone terminal 11.

Then, on the day for drawing of lots, the prize contest server 14 chooses prize winners from all the entry forms, and notifies the prize promoter of the prize winners.

Figure 3:
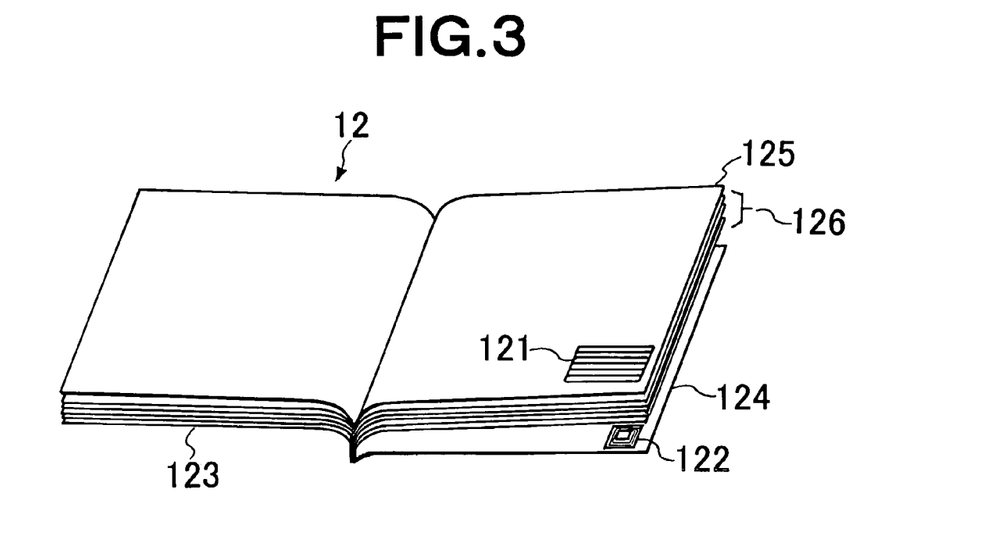
FIG. 3 is an illustration showing the structure of a book shown in FIG. 2.

FIG. 3 is an illustration showing the structure of the book 12 shown in FIG. 2. In FIG. 3, the book 12 includes front cover 123, back cover 124, at least one page of prize ad 125, one or more of the other editorial pages 126, the bar code 121 printed on the prize ad page 125, and the RF-ID tag 122 attached on the back cover 124. The other editorial pages 126 may be not involved in the book 12.

The RF-ID tag 122 and the bar code 121 are arranged to overlap when the user opens the prize ad page 125 to bring the printing surface of the bar code 121 into view in such a manner that the prize ad page 125 comes to cover over the back cover 124.

In this state, other pages 126 may be inserted between the back cover 124 and the prize ad page 125 on which the RF-ID tag is attached. The RF-ID tag 122 and the bar code 121 need to be arranged as close to each other as they can be read at the same time even in such a case.

The prize ad page 125 and the other pages 126 are made of such a material that allows electromagnetic waves to pass through for reading the RF-ID tag 122. In general, normal paper for books can be used without problems, because normal paper allows electromagnetic waves to pass through. As for the bar code 121, it may be JAN (Japan Article Number) bar code. Alternatively, any other bar code (such as QR (Quick Response) bar code, CODE 39, UPC-A/E, or CODE93) printable on paper may also be used.

The RF-ID tag 122 may be attached to any location other than the back cover 124 on the condition that "the bar code 121 overlaps the RF-ID tag 122." For example, it may be attached on the front cover 123 or one of the other pages 126.

Two kinds of information are recorded in the bar code 121. One is information indicating that the bar code 121 is for a prize ad and the information make possible judgment that any kind of prize ad is published on the page (prize ad page 125) on which the bar code 121 is printed.

The other is prize ad identification information and the contents of the prize ad identification information vary depending on the prize ad. However, prize ads having the same contents are assigned the same identification information even when they are published in different books.

The cellular phone terminal 11 can contact the prize ad data management server 17 based on the identification information on the prize ad to acquire an entry form with items to be filled in for participation in the prize contest. On the other hand, information for identifying the book 12 to which the RF-ID tag 122 is attached is recorded in the RF-ID tag 122.

Figure 4:
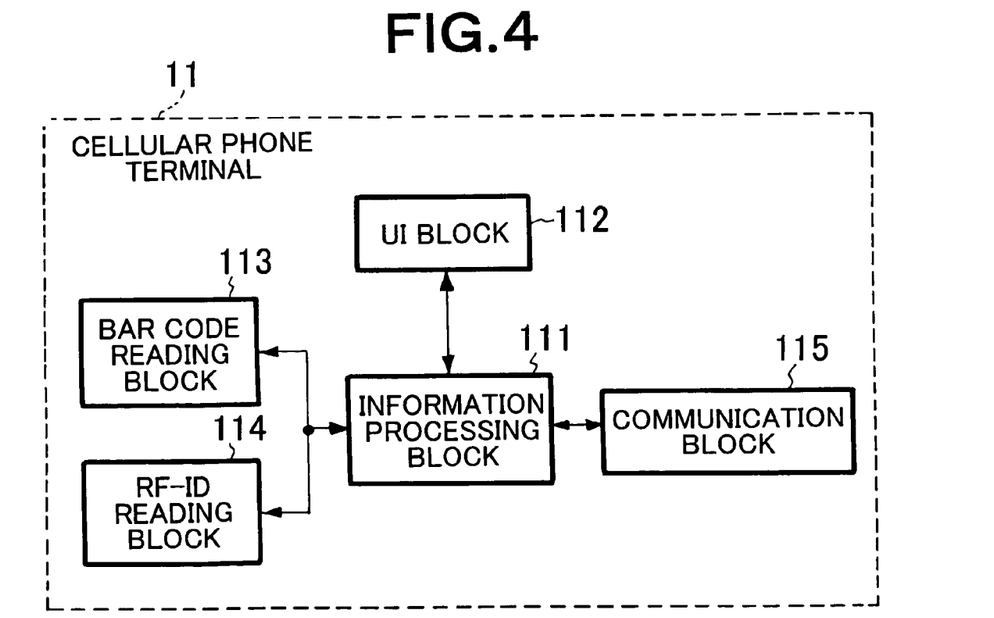
FIG. 4 is a functional block diagram showing the structure of a cellular phone terminal of FIG. 2.

FIG. 4 is a functional block diagram showing the structure of the cellular phone terminal 11 of FIG. 2. In FIG. 4, the cellular phone terminal 11 includes information processing block 111, UI (User Interface) block 112, bar code reading block (bar code reader) 113, RF-ID reading block (RF-ID reader) 114, and communication block 115.

Figure 8:
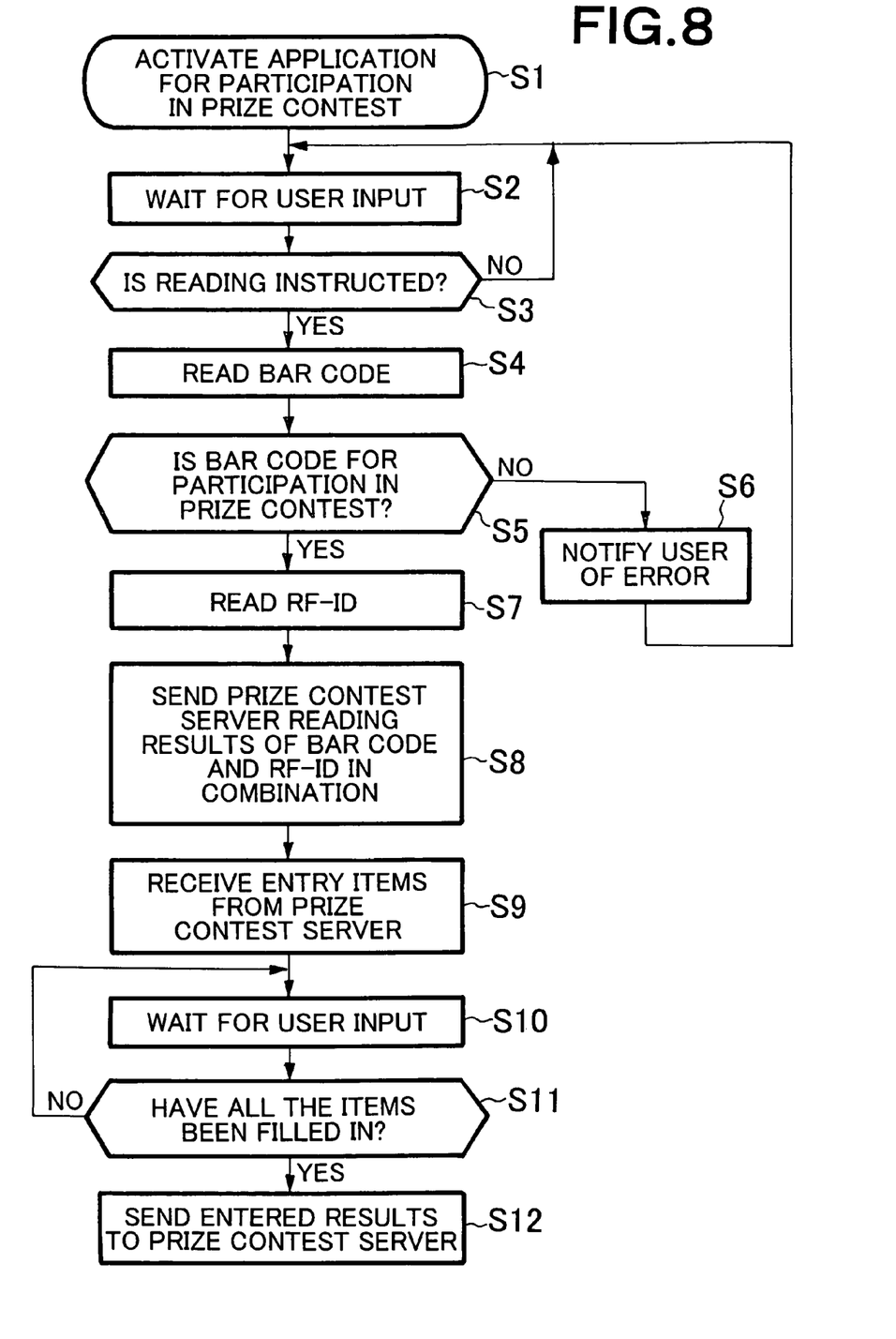
FIG. 8 is a flowchart showing an internal processing algorithm of the cellular phone terminal of FIG. 2.

The information processing block 111 (as control means) composed of a computer and software running on the computer, performs processing to be described later. The computer comprises a Central Processing Unit (CPU), and a read only memory (ROM) which retains, for example, programs that the flowchart shown in FIG. 8 is described, and a random access memory (RAM) which retains data for information processing.

The UI block 112 is composed of output devices for providing information to the user (such as a liquid crystal display (LCD), speakers, a vibrator, a light emitting diode (LED), etc.), and input devices for allowing the user to enter information (such as button switches, slide switches, a touch panel, etc.). In this case, each of the devices in the UI block 112 is controlled by the information processing block 111.

The bar code reading block 113 composed of a bar code reader and the bar code reader is controlled by the information processing block 111. The RF-ID reading block 114 composed of a RF-ID reader and the RF-ID reader is also controlled by the information processing block 111.

The communication block 115 performs wireless communication through the cellular phone network 400 and is controlled by the information processing block 111. The communication block 115 is well-known to those skilled in the art, and the detailed description thereof will be omitted.

The bar code reading block 113 may also be composed by using a general-purpose camera function and an image processing function, instead of the bar code reader. Further, the communication block 115 may be composed by using any wireless communication means, such as a wireless local area network (LAN) function, other than the wireless communication means through the cellular phone network 400.

The POS terminal 15 communicates with the POS server 16 through the POS private (dedicated) communication network 600. The POS terminal 15 reads the RF-ID tag attached to each of commodities (commercial products).

Figure 5:
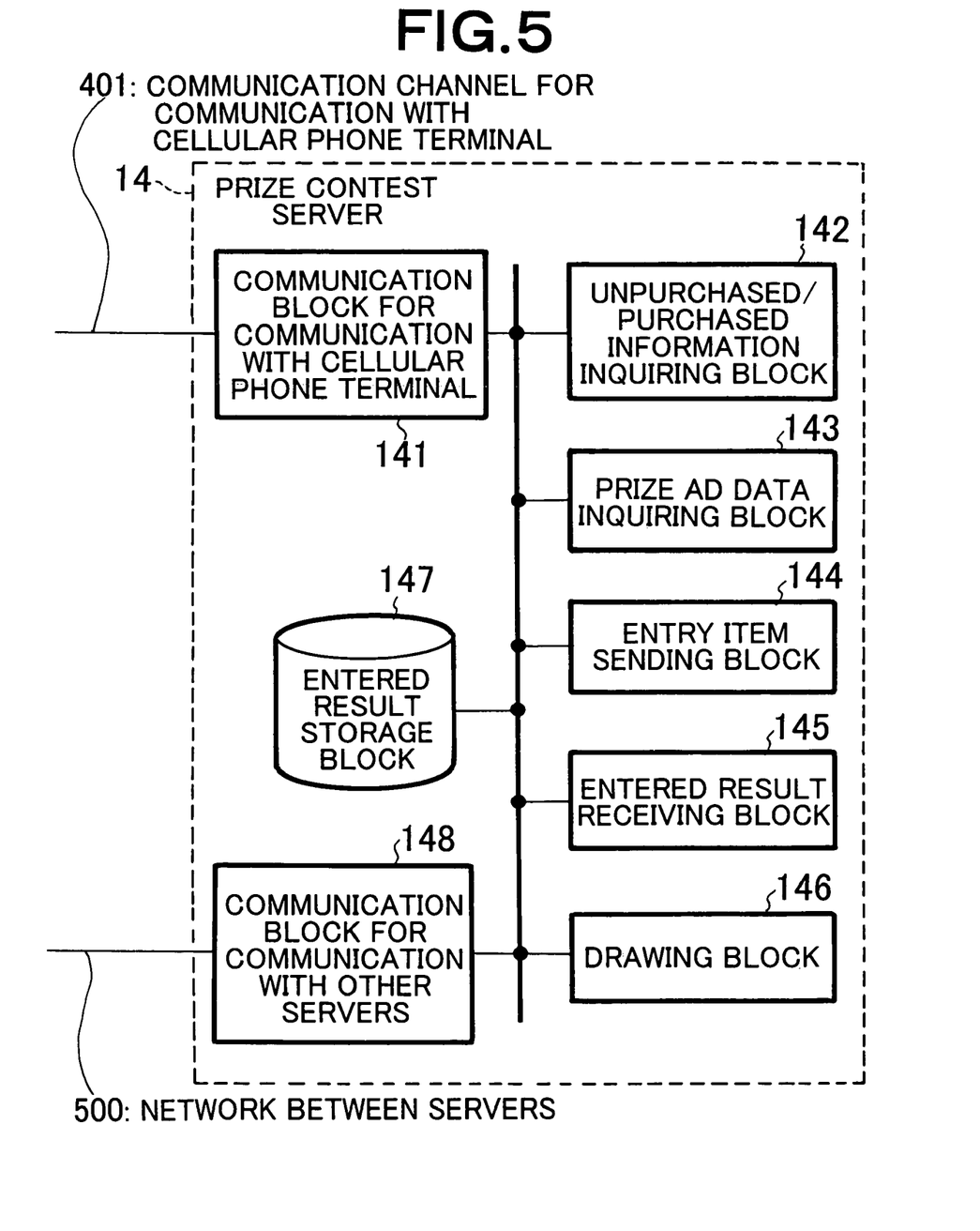
FIG. 5 is a functional block diagram showing the structure of a prize contest server of FIG. 2.

FIG. 5 is a functional block diagram showing the structure of the prize contest server 14 of FIG. 2. In FIG. 5, the prize contest server 14 is a computer with a communication function. The prize contest server 14 includes communication block 141 for communication with cellular phones, unpurchased/purchased information inquiring block 142, prize ad data inquiring block 143, entry item sending block 144, entered result receiving block 145, drawing block 146, entered result storage block 147, and communication block 148 for communication with the other servers.

The communication block 141 for communication with cellular phones is composed of a communication device connectable to communication channel 401 provided by a cellular phone system provider. The unpurchased/purchased information inquiring block 142 is implemented via software for contacting the POS server 16 through the communication block 148 for communication with the other servers.

The prize ad data inquiring block 143 is implemented via software for contacting the prize ad data management server 17 through the communication block 148 for communication with the other servers. The entry item sending block 144 is implemented via software for sending an entry form with items to be filled in for participation in the prize contest to the cellular phone terminal 11 through the communication block 141 for communication with cellular phones.

The entered result receiving block 145 is implemented via software for receiving the results of filling in the entry items, necessary for participation in the prize contest, from the cellular phone terminal 11 through the communication block 141 for communication with cellular phones, and writing the entered results into the entered result storage block 147. The drawing block 146 is implemented via software for choosing prize winners from all the entered results stored in the entered result storage block 147. Random number may be used to choose the prize winners.

The entered result storage block 147 is composed of a storage device accessible from the computer for storing all the results of prize contest participations (all the entered results necessary for participation in the prize contest). The communication block 148 for communication with the other servers is composed of a communication device connectable to the network between servers (inter-server network) 500.

Figure 6:
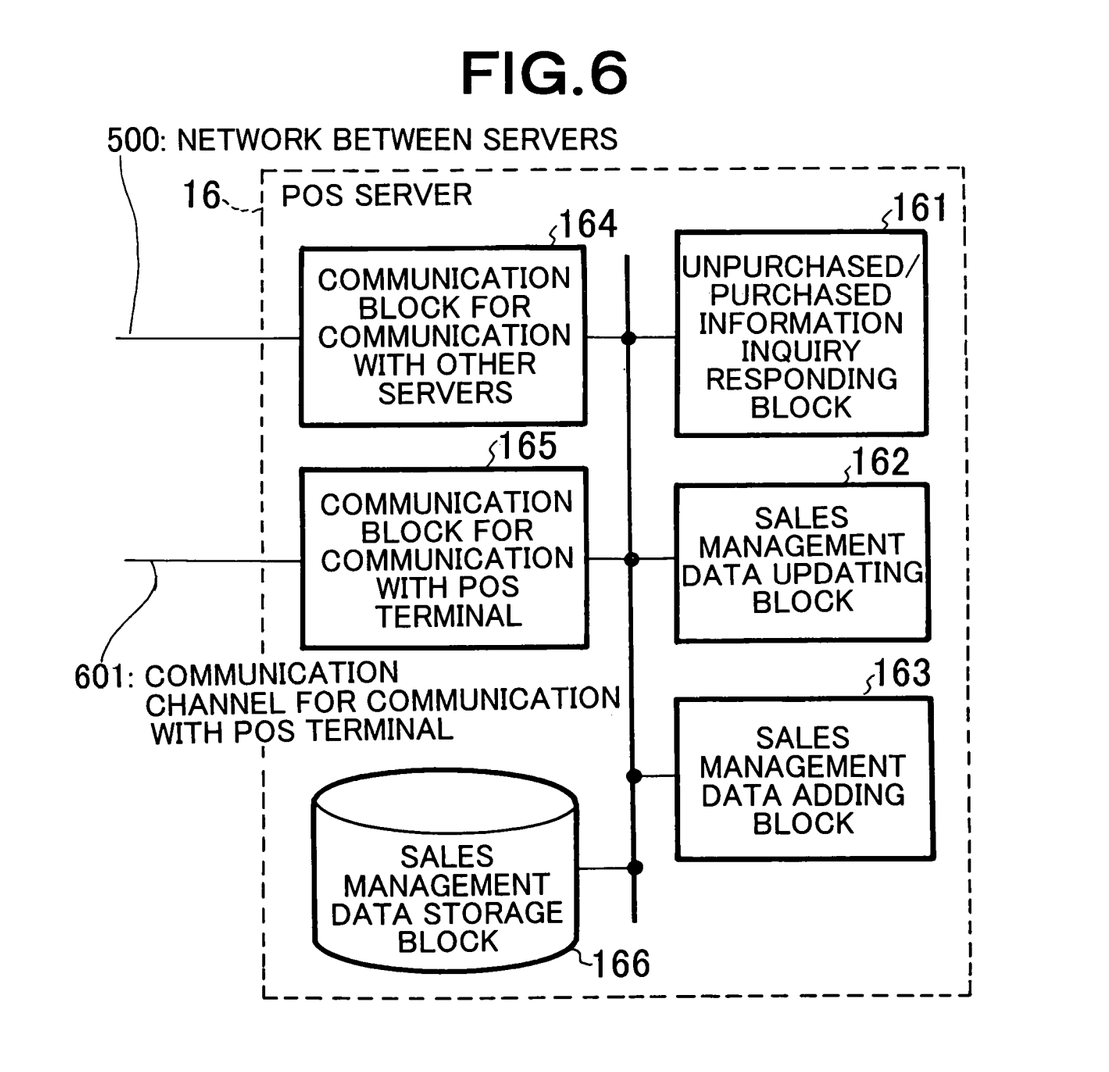
FIG. 6 is a functional block diagram showing the structure of a POS server of FIG. 2.

FIG. 6 is a functional block diagram showing the structure of the POS server of FIG. 2. In FIG. 6, the POS server 16 is a computer with a communication function. It includes unpurchased/purchased information inquiry responding block 161, sales management data updating block 162, sales management data adding block 163, communication block 164 for communication with the other servers, communication block 165 for communication with POS terminal, and sales management data storage block 166.

The unpurchased/purchased information inquiry responding block 161 is implemented via software for responding to an inquiry from the unpurchased/purchased information inquiring block 142 in the prize contest server 14 through the communication block 164 for communication with the other servers, on the basis of the data stored in the sales management data storage block 166.

The sales management data updating block 162 is implemented via software for updating the data stored in the sales management data storage block 166 on the basis of POS data updating information sent from the POS terminal 15 through the communication block 165 for communication with the POS terminal 15. The sales management data adding block 163 is implemented via software for adding sales management data. The sales management data storage block 166 stores the added sales management data on the POS server 16.

The communication block 164 for communication with the other servers is composed of a communication device communicable with the POS terminal 15 through communication channel 601. The sales management data storage block 166 is composed of a storage device accessible from the computer for storing the sales management data.

Figure 7:
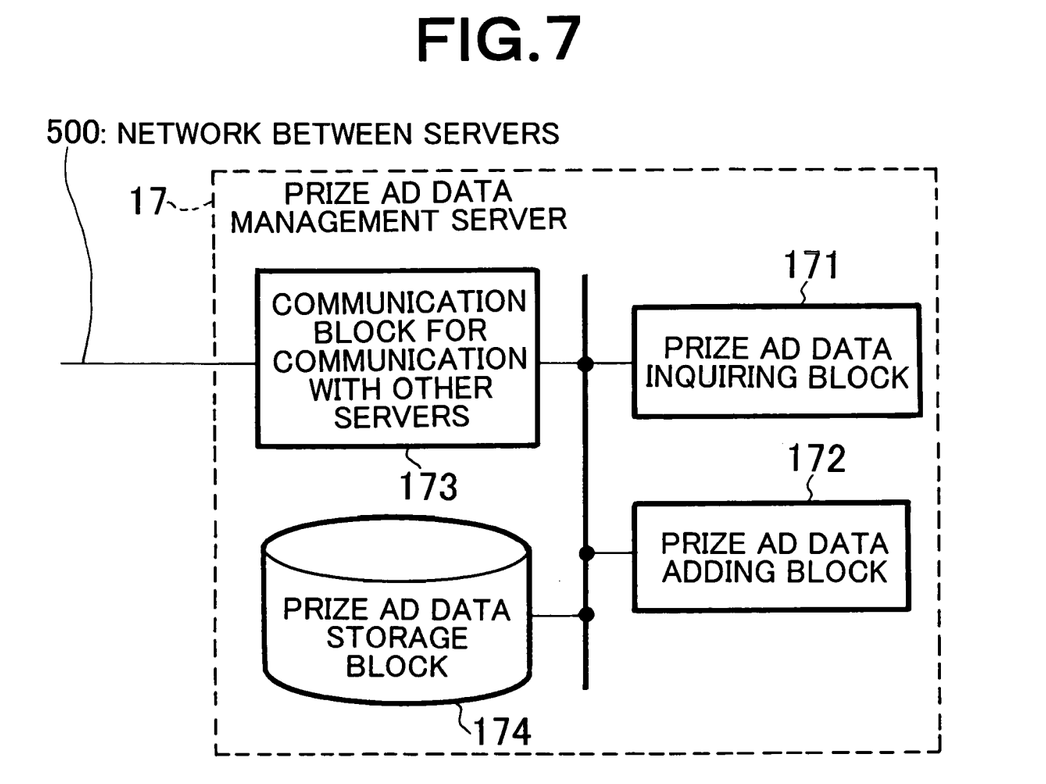
FIG. 7 is a functional block diagram showing the structure of a server for managing advertisement data for prize contests, or a prize ad data management server of FIG. 2.

FIG. 7 is a block diagram showing the structure of the prize ad data management server 17 of FIG. 2. In FIG. 7, the prize ad data management server 17 is a computer with a communication function. It includes prize ad data inquiry responding block 171, prize ad data adding block 172, communication block 173 for communication with the other servers, and prize ad data storage block 174.

The prize ad data inquiry responding block 171 is implemented via software for responding to an inquiry from the prize ad data inquiring block 143 in the prize contest server 14 through the communication block 173 for communication with the other servers. The prize ad data adding block 172 is implemented via software for adding prize ad data. The prize ad data storage block 174 stores the added prize ad data on the prize ad management server 17. The prize ad data are data for associating the bar code 121 with the entry items necessary for participation in the prize contest. The entry items are questionnaire items to be filled in by each participant for participation in the prize contest. For example, the entry items are the address, name, etc., of the participant. The prize ad data are configured so that the entry items necessary for participation in the prize contest can be derived therefrom based on the contents of the bar code 121.

The communication block 173 for communication with the other servers is composed of a communication device connectable to the network between servers (the inter-server network) 500. The prize ad data storage block 174 is composed of a storage device accessible from the computer for storing all the prize ad data (data for associating the bar code 121 with the entry items necessary for participation in the prize contest).

Figure 9:
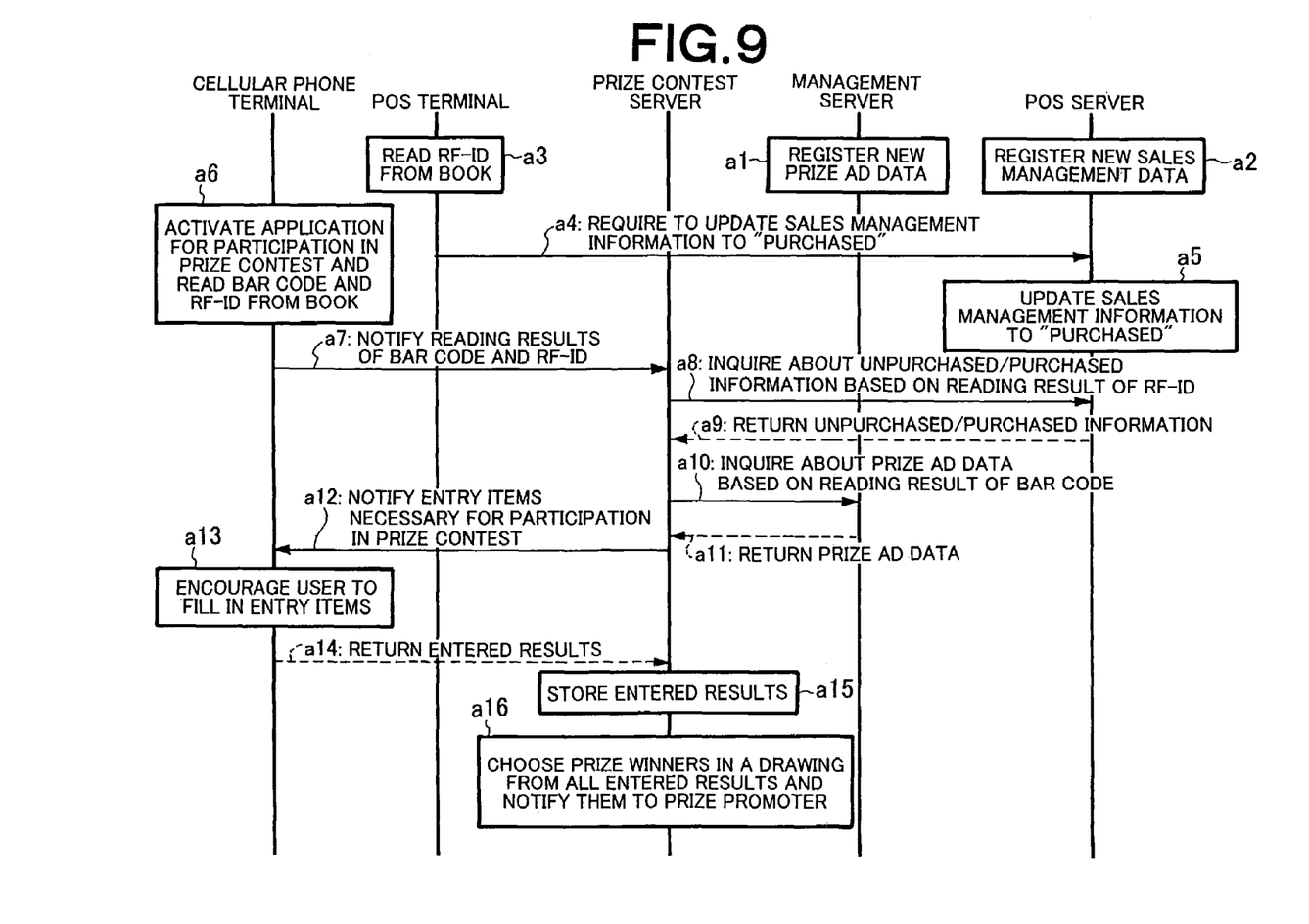
FIG. 9 is a sequence chart showing the operation of a book prize offering system according to the embodiment of the present invention.

FIG. 8 is a flowchart showing an internal processing algorithm of the cellular phone terminal 11 of FIG. 2, and FIG. 9 is a sequence chart showing the operation of the book prize offering system according to the embodiment of the present invention. Referring to FIGS. 2 to 9, the operation of the book prize offering system according to the embodiment of the present invention will be described.

The prize ad data management server 17 first registers new prize ad data (procedure a1 in FIG. 9). In this case, before starting the prize contest, the prize promoter registers prize ad data on the prize ad data management server 17 through the prize ad data adding block 172.

The POS server 16 registers new sales management data (procedure a2 in FIG. 9). In this case, before starting the prize contest, book retailers selling books in which the prize ad is published register "unpurchased" in the sales management data on each book to the POS server 16 through the sales management data adding block 163.

In operation, the POS terminal 15 reads the RF-ID tag 122 of the book 12 (procedure a3 in FIG. 9). In other words, when a user buys the book 12 at a retail store, a sales person reads the RF-ID tag 122 of the book 12 through the POS terminal 15.

The POS terminal 15 requires the POS server 16 to update the sales management data to "purchased" (procedure a4 in FIG. 9). In this case, the POS terminal 15 communicates with the POS server 16 through the communication channel 601 for communication with POS server to request the POS server 16 to update the sales management data on the book 12 to "purchased".

The POS server 16 updates the sales management data to "purchased" (procedure a5 in FIG. 9). In this case, the POS server 16 updates the sales management data on the book 12 to "purchased" through the sales management data updating block 162.

After completion of the sequence of procedures a3 to a5, the processing when the user buys the book 12 is ended.

After buying the book 12, the user activates an application for participation in a prize contest on the cellular phone terminal 11 to read the bar code 121 and RF-ID tag 122 from the book 12 (procedure a6 in FIG. 9). In this case, when finding a prize ad in the book 12 purchased and wanting to participate in the prize contest, the user activates the application (software program) for participation in the prize contest on the cellular phone terminal 11 (step S1 in FIG. 8).

Then, when the application for participation in the prize contest is activated, the cellular phone terminal 11 reads the bar code 121 printed on the page of the prize ad through the bar code reading block 113 in accordance with the instructions from the user (steps S2 to S4 in FIG. 8).

The cellular phone terminal 11 judges whether the read bar code 121 is for participation in the prize contest (step S5 in FIG. 8). This can be judged based on whether the bar code 121 includes data indicating that the bar code 121 is for participation in the prize contest.

When the cellular phone terminal 11 determines that the bar code 121 is for participation in the prize contest, since there is the RF-ID tag 122 that pairs up with the bar code, the paired RF-ID tag 122 is automatically read (without any operation by the user) (step 7 in FIG. 8). In this case, since the bar code 121 and RF-ID tag 122 are arranged in such positions that they can be read out by one reading act, there is not need for the user to move the cellular phone terminal 11 from position to position. On the other hand, when determining that the bar code 121 is not for participation in the prize contest, the cellular phone terminal 11 notifies the user of an error (step S6 in FIG. 8), and returns to step S2 and waits for user input.

The steps S4 to S7 in FIG. 8 may be changed as following. The step S4 and the step S7 are executed in concurrency, that is, bar code reading and RF-ID reading are executed in concurrency. RF-ID information is stored in a memory such as a random access memory (RAM). Then, in the step S5, the cellular phone terminal 11 judges whether the read bar code 121 is for participation in the prize contest. If the read bar code 121 is for participation in the prize contest, the RF-ID information is read out from the memory. On the other hand, if the read bar code 121 is not for participation in the prize contest, the RF-ID information is deleted from the memory.

The flowchart shown in FIG. 8 is implemented by executing a program that the flowchart is described. The flowchart that the step S4 and the step S7 are executed in concurrency may be implemented by executing a program that the flowchart is described.

The cellular phone terminal 11 notifies the prize contest server 14 of the reading results of the bar code 121 and RF-ID tag 122 (procedure a7 in FIG. 9). After completion of reading the bar code 121 and RF-ID tag 122, the cellular phone terminal 11 sends the reading results in combination to the prize contest server 14 (step S8 in FIG. 8). In this case, the cellular phone terminal 11 communicates with the prize contest server 14 through communication channel 401.

The prize contest server 14 contacts the POS server 16 for unpurchased/purchased information based on the reading result of the RF-ID tag 122 (procedure a8 in FIG. 9). In this case, upon receipt of the reading results of the bar code 121 and RF-ID tag 122, the prize contest server 14 inquires of the POS server 16 whether the book 12 that the user has at hand has been purchased, through the unpurchased/purchased information inquiring block 142.

The information on which the inquiry is based is the reading result of the RF-ID tag 122 including the book identification information on the book 12. The inquiry is made through the communication block 148 for communication with the other servers and the inter-server network 500.

The POS server 16 returns the unpurchased/purchased information in response to the inquiry from the prize contest server 14 (procedure a9 in FIG. 9). In this case, upon receipt of the reading results of the RF-ID 122 tag 122, the POS server 16 returns to the prize contest server 14 the unpurchased/purchased information through the unpurchased/purchased information inquiry responding block 161 on the basis of the sales management data stored in the sales management data storage block 166. The response is sent through the communication block 164 for communication with the other servers and the inter-server network 500.

The prize contest server 14 contacts the prize ad data management server 17 for prize ad data (entry items necessary for participation in the prize contest) based on the reading result of the bar code 121 (procedure a10 in FIG. 9). In this case, when it is determined that the book 12 has been purchased from the unpurchased/purchased information received, the prize contest server 14 contacts the prize ad data management server 17, through the prize ad data inquiring block 143, for prize ad data on the prize contest in which the user wants to participate.

The information on which the inquiry is based is the reading result of the bar code 121 including the prize ad identification information. The inquiry is made through the communication block 148 for communication with the other servers and the inter-server network 500.

On the other hand, when it is determined that the book 12 has not been purchased yet, since it is impossible to participate in the prize contest, further processing steps are not performed. When the book 12 has not been purchased yet, the prize contest server 14 may instruct the cellular phone terminal 11 to display such a screen that encourages the user to buy the book 12.

The prize ad data management server 17 returns the prize ad information in response to the inquiry from the prize contest server 14 (procedure a11 in FIG. 9). In this case, upon receipt of the reading result of the bar code, the prize ad data management server 17 returns to the prize contest server 14 the prize ad information through the prize ad data inquiry responding block 171 on the basis of the prize ad data stored in the prize ad data storage block 174. The response is sent through the communication block 173 for communication with the other servers and the inter-server network 500.

The prize contest server 14 notifies the cellular phone terminal 11 of the entry items to be filled in for participation in the prize contest and to be sent from the prize ad data management server 17 (procedure a12 in FIG. 9). In this case, upon receipt of the prize ad data (the entry items necessary for participation in the prize contest) from the prize ad data management server 17, the prize contest server 14 sends the prize ad data to the user's cellular phone terminal 11. The data is sent through the communication block 141 for communication with cellular phones and the communication channel 401 for communication with cellular phones.

The cellular phone terminal 11 encourages the user to fill in the entry items sent from the prize contest server 14 (procedure a13 in FIG. 9). In this case, upon receipt of the entry items necessary for participation in the prize contest from the prize contest server 14, the cellular phone terminal 11 provides the user with the display screen for filling in the entry items and encourages the user to fill in the entry items.

The entry form may include items necessary to fill in and items optional to fill in. In such a case, when the entry of the items necessary to fill in is finished, the user can finish the entry to the entry form. (steps S9 to S11 in FIG. 8).

Then, the cellular phone terminal 11 returns the results entered by the user to the prize contest server 14 (procedure a14 in FIG. 9). In other words, the cellular phone terminal 11 sends the prize contest server 14 the entered results of the items necessary to fill in for participation in the prize contest (step S12 in FIG. 8) through the communication channel 401 for communication with cellular phone.

The prize contest server 14 stores the entered results from the cellular phone terminal 11 (procedure a15 in FIG. 9). In this case, upon receipt of the entered results from the cellular phone terminal 11 through the entered result receiving block 145, the prize contest server 14 stores the entered results from the cellular phone terminal 11 via the entered result storage block 147.

After completion of the sequence of procedures a6 to a15, the processing when the user participates in the prize contest is ended.

Then, when the prize contest period ends, prize winners are chosen in a drawing from the entry forms or entered results from the cellular phones, and notified to the prize promoter (procedure a16 in FIG. 9). In this case, when the prize contest period ends, the prize contest server 14 uses the drawing block 146 to decide on the prize winners from all the entered results stored in the entered result storage block 147, and notifies the prize promoter of the prize winners. The prize promoter sends out prize goods to the prize winners by using the entered results stored in the entered result storage block 147.

Thus, in the embodiment, the bar code 121 printed in a commercial product (for example, the book 12) and the RF-ID tag 122 attached to the commercial product are arranged in such positions that they can be read out by one reading act. It allows the user (purchaser of the book 12 and participant in the prize contest) to participate in the prize contest with simple operations.

Further, in the embodiment, since the bar code 121 and RF-ID tag 122 are used in combination, not only the prize ad identification information and the book identification information on the book 12 can be managed separately, but also both of information can be used in combination.

For example, a creator of the prize ad can create a bar code irrespective of the number of copies of each book in which the prize ad is published, while book retailers can manage the sales of the book irrespective of the kind and number of prize ads in the book.

In addition, in the embodiment, since information indicating that the bar code 121 is for a prize ad is stored in the bar code 121, the reading of the RF-ID tag 122 that pairs up with the bar code 121 can be automatically started in conjunction with reading of the bar code 121 because there is no need to contact any external server so as to confirm whether the bar code is for the prize ad.

As abovementioned, in the embodiment, sine information indicating that the bar code is for a prize ad is stored in the bar code, the reading of the RF-ID tag that pairs up with the bar code can be automatically started because there is no need to contact any external server.

However, in the embodiment, the following information processing may be executed. Previously, relation information indicating whether identification information or the like contained in the bar code relates with information contained in the RF-Id tag, is recorded on a data base of a cellular phone terminal or a data base of an eternal server. The data base of the cellular phone terminal is retrieve to get the relation information on the basis of the identification information or the like read from the bar code, or the identification information or the like read from the bar code is transmitted to the eternal server and the data base of the eternal server is retrieve to get the relation information on the basis of the identification information or the like read from the bar code. Judgment about whether reading from the RF-ID tag should be started is done on the basis of a retrieved result at the data base of the cellular phone terminal or a retrieved result transmitted from the eternal server.

Concretely, relation between identification information of prize ad and employing of "must-buy prize contest" system is previously recorded on a data base of a cellular phone terminal or the prize ad data storage block 174 of the prize ad data management server 17. The data base of the cellular phone terminal is retrieve to get information about whether "must-buy prize contest" is employed on the basis of the identification information read from the bar code, or the identification information read from the bar code is transmitted to the prize ad data management server 17 through the prize ad server and the prize ad data storage block 174 of the prize ad data management server 17 is retrieve to get information about whether "must-buy prize contest" is employed on the basis of the identification information read from the bar code.

Then, judgment about whether the book identification information on the book 12 should be read from the RF-ID tag is done on the basis of a retrieved result at the data base of the cellular phone terminal or a retrieved result transmitted from the prize ad data management server 17. The judgment may be done on the basis of the book identification information stored in memory, when bar code reading and RF-ID reading are executed in concurrency and the read RF-ID information is stored in a memory. The abovementioned information processing is also applied for the following second embodiment.

Second Embodiment

Figure 10:
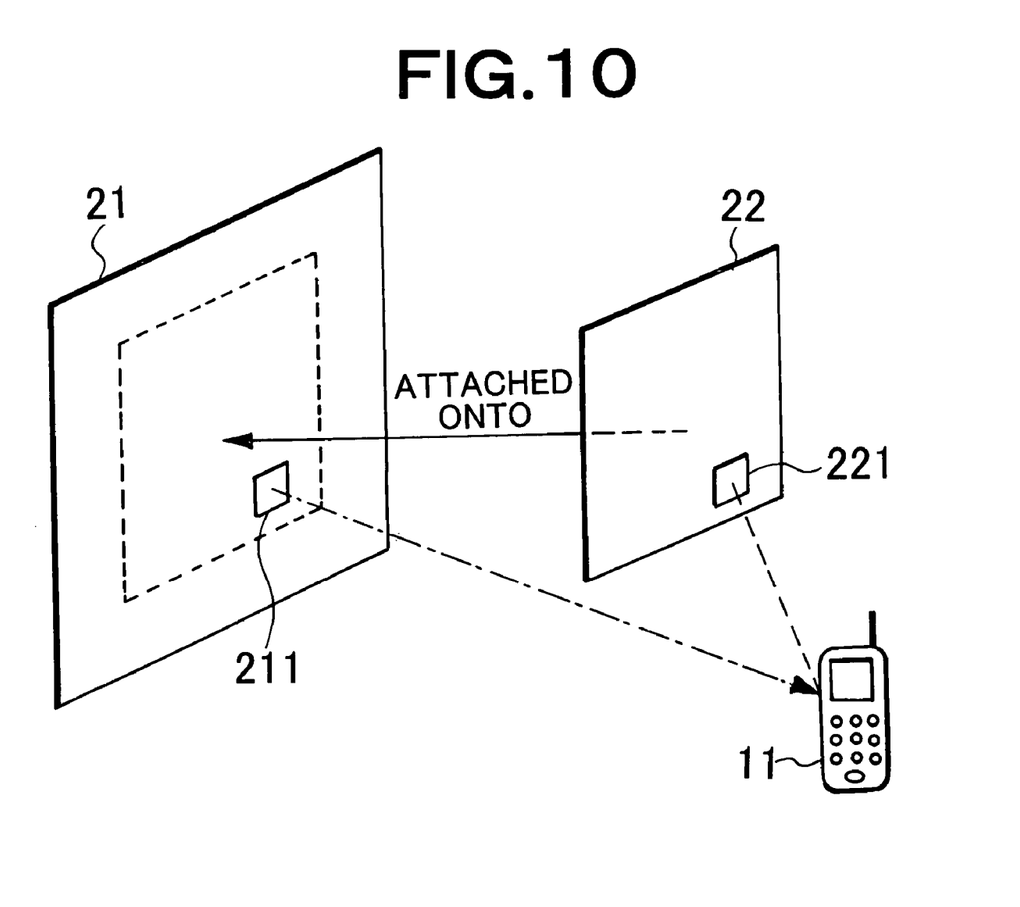
FIG. 10 is an illustration showing another embodiment in which the present invention is applied to a billboard.

FIG. 10 is an illustration showing another embodiment in which the present invention is applied to street signboards or billboards. In FIG. 10, this embodiment is to apply the present invention to billboard advertisement. The embodiment has the same system structure as the book prize offering system according to the first embodiment of the present invention as shown in FIGS. 2 to 7.

In FIG. 10, billboard 21 is placed in a street as a bulletin board and the advertising space of the billboard 21 is lent for free or on a chargeable basis. RF-ID tag 211 is attached on the billboard 21. Location identification information indicating the installation location of the billboard (such as a code assigned by the billboard provider) is recorded in the RF-ID tag 211.

Advertising poster 22 is posted on the billboard 21. Bar code 221 is printed on the advertising poster 22. Two kinds of information, that is, "identification information indicating the contents of the poster" and "information indicating that the bar code is to be used in combination with a RF-ID tag," are recorded in the bar code 221. In general, many copies of the advertising poster 22 are printed out. In this case, the same bar code 221 is printed on all the copies.

The position of the attachment of the RF-ID tag 211 on the billboard 21 and the printing position of the bar code 221 on the advertising poster 22 are predetermined, under the agreement between the billboard provider and a poster producer, in order that the RF-ID tag 211 and bar code 221 overlap each other when the advertising poster 22 is attached on the billboard 21.

The cellular phone terminal 11 in FIG. 10 has the same structure as the cellular phone terminal shown in FIG. 4. In other words, the cellular phone terminal 11 includes a bar code reader (bar code reading block 113), a RF-ID reader (RF-ID reading block 114), and a communication function (communication block 115) for communication through the cellular phone network 400.

Because the bar code 221 and RF-ID tag 211 are set to overlap each other in the billboard 21 on which the advertising poster 22 is attached, the bar code 221 and RF-ID tag 221 in the cellular phone terminal 11 are provided close to each other as shown FIG. 11, and an axis of the RF-ID reader is leaned to a direction of a readable area of the bar code reader. The length of the reading range of the RF-ID reader is set to be longer by about 1 cm than that of the reading range of the bar code reader. The length of 1 cm is sufficient length because a poster is very thin.

In operation, if a user walking by the billboard 21 is interested in the contents of the advertising poster 22 on the billboard 21, he or she can read the bar code 221 by using the bar code reader of the cellular phone terminal 11. Like in the first embodiment, the cellular phone terminal 11 also reads the RF-ID tag 211 automatically by using the RF-ID reader, and contacts a server (not shown) for information through the cellular phone network 400.

As a result, information that combines the installation location information on the billboard 21 and the contents of the advertising poster 22 is downloaded on the cellular phone terminal 11. In a specific example in which the user (consumer) has read the poster for a chain restaurant company by using the cellular phone terminal 11, guide information showing the way to the nearest chain's restaurant from the current position of the user (determined from the installation location information on the billboard) is displayed on the cellular phone terminal 11.

Thus, in the embodiment, the RF-ID tag 211 and bar code 221 are arranged in such positions that the bar code reader and RF-ID reader in the cellular phone terminal 11 can read them by one reading act. It allows the user to get desired information with a simple operation.

Further, in the embodiment, since the RF-ID tag 211 and bar code 221 are used in combination, the billboard provider has only to manage the billboard installation position information irrespective of the contents of the poster, while the poster producer can print the same bar code on all the copies of the same poster irrespective of the installation location of each poster.

In addition, in the embodiment, since "information indicating that the bar code 221 is to be used in combination with a RF-ID tag" is recorded in the bar code 221, the reading of the RF-ID tag 211 that pairs up with the bar code 121 can be automatically started in conjunction with reading of the bar code 221.

In the first and second embodiments, reading by the bar code reader and reading by the RF-ID tag can be executed in concurrency, or one of the reading by the bar code reader and reading by the RF-ID tag can be executed after the other of that.

If one of reading by the bar code reader and reading by the RF-ID reader is executed after the other of that, necessity of one of the two reading is judged on the basis of information read by the other of the two reading. Thus, when necessity is not admitted, one of reading is not executed. If information that reading is not executed is information to be read out by the RF-ID reader, power consumption of the RF-ID reader can be reduced. On the other hand, if information that reading is not executed is information to be read out by the bar code reader, focus operation of a digital camera as a bar code reader can be omitted or power consumption of the laser device as a bar code reader can be reduced.

What is claimed is:

1. An information processing system comprising:
   a device comprising:
      a bar code reader for reading first information from a bar code displayed on an item on which a radio frequency identification tag is attached; and
      a tag reader for reading second information from a radio frequency identification tag, said second information comprising data unique to the item,
   wherein said bar code reader and said tag reader are arranged so that when one of said bar code reader and said tag reader is moved to a readable position, the other of said bar code reader and said tag reader comes to a readable position, and said radio frequency identification tag is under said bar code for said bar code reader and tag reader.

2. The information processing system according to claim 1, further comprising a server comprising item data, the server in communication with the device, the server receiving said first and second information from the device and sending third information to the device based on the item data.

* * * * *